US007516173B2

(12) United States Patent
Wijeratne (10) Patent No.: US 7,516,173 B2
(45) Date of Patent: Apr. 7, 2009

(54) CARRY-SKIP ADDER HAVING MERGED CARRY-SKIP CELLS WITH SUM CELLS

(75) Inventor: Sapumal Wijeratne, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 10/911,824

(22) Filed: Aug. 4, 2004

(65) Prior Publication Data

US 2006/0031280 A1    Feb. 9, 2006

(51) Int. Cl.
G06F 7/50    (2006.01)
(52) U.S. Cl. .................................. 708/710
(58) Field of Classification Search .......... 708/710–714
See application file for complete search history.

(56) References Cited

U.S. PATENT DOCUMENTS

| 4,556,948 | A | | 12/1985 | Mercy | |
|---|---|---|---|---|---|
| 5,337,269 | A | * | 8/1994 | McMahan et al. | 708/711 |
| 5,555,517 | A | * | 9/1996 | Agrawal et al. | 708/672 |
| 5,581,497 | A | * | 12/1996 | Kumar | 708/711 |
| 5,877,973 | A | | 3/1999 | Kato et al. | |
| 6,199,091 | B1 | | 3/2001 | Kobayashi et al. | |
| 6,567,836 | B1 | * | 5/2003 | Fletcher | 708/710 |
| 6,584,484 | B1 | * | 6/2003 | Goldovsky et al. | 708/706 |
| 2002/0091744 | A1 | * | 7/2002 | Kantabutra et al. | 708/712 |

FOREIGN PATENT DOCUMENTS

| JP | 02-245926 | 10/1990 |
|---|---|---|
| JP | 06-051950 | 2/1994 |
| JP | 09-231055 | 9/1997 |

OTHER PUBLICATIONS

Liu, Tin and Qin, Yue, "CSE477 Project Design Specifications for a Carry Skip Adder Design," CSE477 Project Web Page, Penn State University (Computer Science and Engineering Department), Feb. 27, 2003. http://www.cse.psu.edu/~yqin/cskip_spec.html.
Burgess, N., "Accelerated Carry-Skip Adders with Low Hardware Cost," IEEE, vol. 1, Conf. 35, Nov. 4, 2001, pp. 852-856.
Deleganes, D. J. et al., "LVS Technology for the Intel Premium 4 Processor on 90nm Technology," Intel Technology Journal, vol. 8, No. 1, Feb. 18, 2004, pp. 43-54.
PCT/US2005/024889, International Search Report and Written Opinion, Nov. 4, 2005.

* cited by examiner

*Primary Examiner*—Tan V Mai
(74) *Attorney, Agent, or Firm*—Blakely, Sokoloff, Taylor & Zafman LLP (57) ABSTRACT

A multi-bit adder includes a carry chain, a carry-skip network, sum cells, and a carry-sum cell. The carry chain propagates, generates, or kills carry-in bits. The carry-skip network is coupled to the carry chain to selectively skip the carry-in bits over at least one portion of the carry chain. The sum cells are coupled along the carry chain to sum the carry-in bits with corresponding bits of two operands to generate a multi-bit resultant. The carry-sum cell is coupled to receive one of the carry-in bits to a single intermediate bit position on the carry chain and to generate one bit of the multi-bit resultant having a more significant bit position than the single intermediate bit position.

18 Claims, 7 Drawing Sheets

CARRY-SKIP ADDER HAVING MERGED CARRY-SKIP CELLS WITH SUM CELLS

TECHNICAL FIELD

This disclosure relates generally to multi-bit adders, and in particular but not exclusively, relates to low voltage swing adders.

BACKGROUND INFORMATION

A binary adder is an elementary electronic circuit that adds two binary operands to obtain a binary resultant. An adder that is capable of adding two operands along with a carry-in to obtain a resultant and a carry-out is known as a full adder. Full adders can be coupled in series with the carry-out of one full adder coupled to the carry-in of a next adder to implement a binary adder of greater width.

Figure 1:
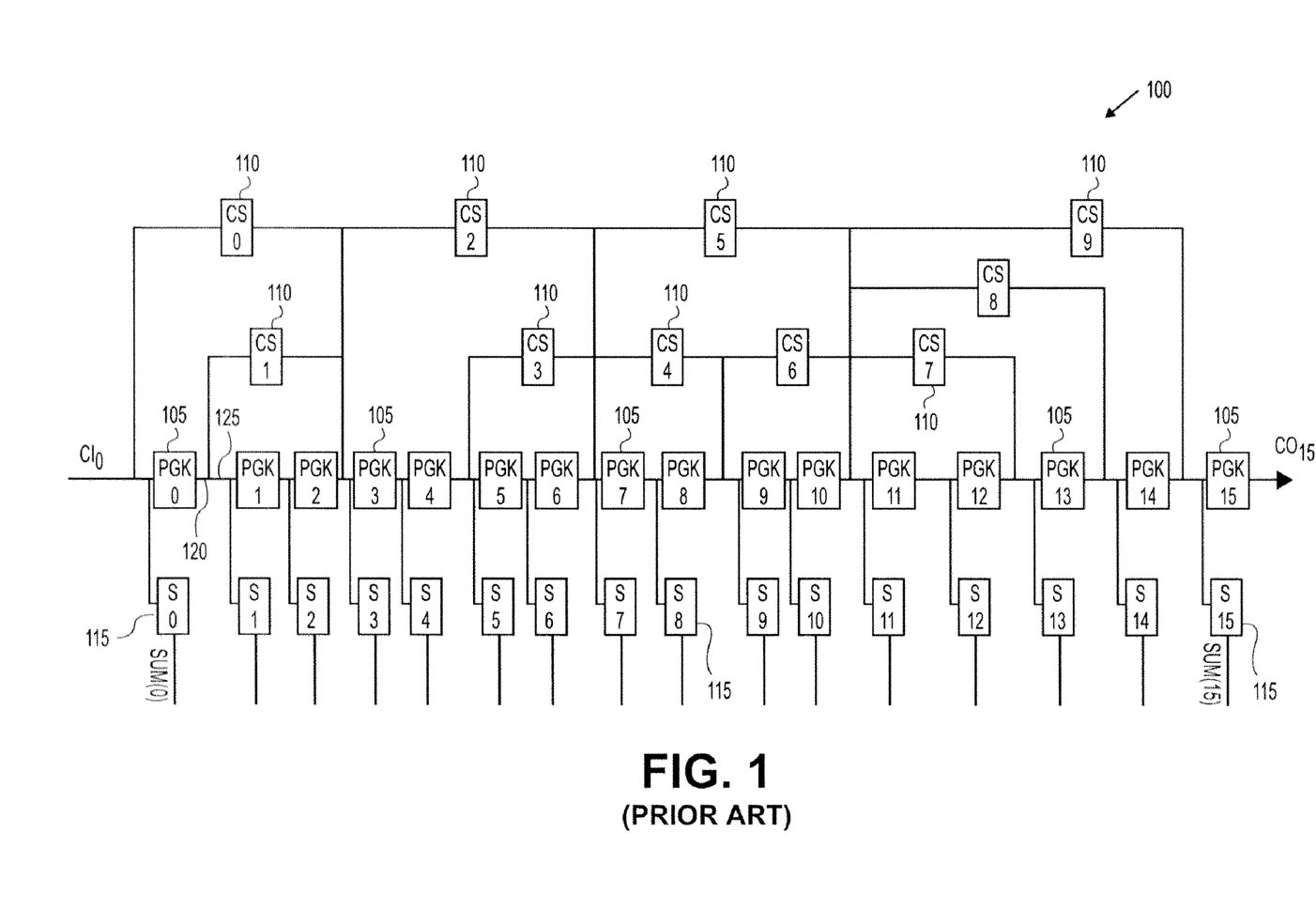
FIG. 1 is a block diagram illustrating a known carry-skip adder circuit.

FIG. 1 illustrates a known 16-bit carry-skip adder 100 having a carry-in ("CI") and a carry-out ("CO"). Carry-skip adder 100 includes propagate-generate-kill ("PGK") stages 105, carry-skip cells 110, and sum cells 115 (only a portion of the elements are labeled so as not to clutter FIG. 1). $CI_0$ represents the carry-in for PGK stage 0. If PGK stage 0 receives a $CI_0$ (i.e., CI="1"), PGK stage 0 can either propagate the $CI_0$ as a carry-out 120 to be receive as a carry-in 125 to PGK stage 1 or kill the $CI_0$, such that PGK stage 1 does not receive carry-in 125. If PGK stage 0 does not receive a $CI_0$ (i.e., CI="0"), then PGK stage 0 can generate carry-out 120 to be received as carry-in 125 to PGK stage 1. Each of PGK stages 105 will either propagate, generate, or kill a carry-in dependent upon the value of the two operand bits corresponding to its bit position.

Sum cells 115 act to sum a carry-in bit with two operand bits having equivalent bit positions to generate a resultant bit of a multi-bit resultant. However, before each sum cell 115 can generate a resultant bit, the corresponding carry-in must be determined. To determine a carry-in, $CI_0$ must be given an opportunity to propagate from PGK stage 0 to PGK stage 15. As such, propagation of carry-ins is a limiting speed factor.

To accelerate the propagation of carry-ins through carry-skip adder 100, PGK stages 105 are coupled into groups by carry-skip cells 110. Corresponding groups of the operands are analyzed to determine whether a carry-in to a group of PGK stages 105 will propagate through the entire group of PGK stages 105. If this condition is true, then the carry-skip cell will skip the carry-in to the group over the group and provide the carry-in to the next group of PGK stages 105. Skipping groups of PGK stages 105 via carry-skip cells 110 incurs less delay than waiting for the carry-in to propagate through each PGK stage of the group. However, even with carry-skip cells 110, propagation of carry-ins through carry-skip adder 100 is still a limiting speed factor.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of an apparatus, system, and method for a high speed multi-bit adder are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
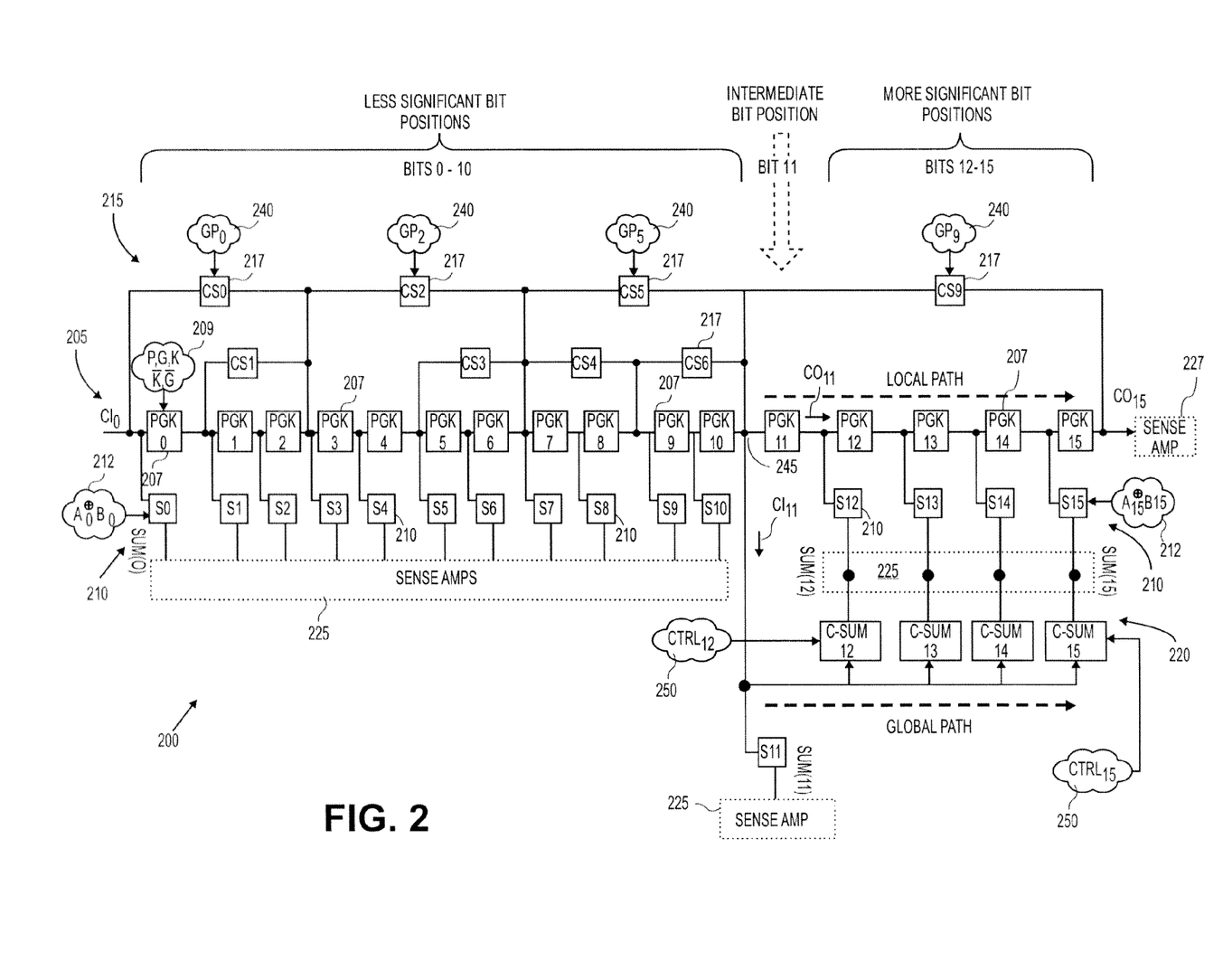
FIG. 2 is a block diagram illustrating an adder including carry-sum cells having merged carry-skip cells with sums cells, in accordance with an embodiment of the present invention.

FIG. 2 is a block diagram illustrating an adder 200, having a modified carry-skip network, in accordance with an embodiment of the present invention. The illustrated embodiment of adder 200 includes a carry chain 205, sum cells$_{0-15}$ 210, a carry-skip network 215, carry-sum$_{12-15}$ cells 220, and sense amplifiers 225. Carry chain 205 includes propagate-generate-kill ("PGK") stages$_{0-15}$ 207, carry-skip network 215 includes carry-skip cells$_{0-6,9}$ 217. The subscripts associated with each of PGK stages 217, sum cells 210, and carry-sum cells 220 designate bit positions. Although adder 200 is illustrated as a 16-bit adder, it should be appreciated that the techniques described herein are equally applicable to larger or smaller adders, such as for example, 4-bit adders, 32-bit adders, 64-bit adders, and the like.

Carry chain 205 provides a mechanism for carry-ins ("CI") 0 through 15 to be propagated, generated, or killed for each bit position. The CI for one of PGK stages 207 is the same as the carry-out ("CO") of the previous PGK stage 207. For example, $CO_0$ is equal to $CI_1$ and so on. As mentioned above, each PGK stage 207 can either propagate, generate, or kill a carry bit. The CO of a particular PGK stage 207 is determined according to equation 1, $$CO_N = A_N \cdot B_N + A_N \cdot CI_N + B_N \cdot CI_N \qquad \text{(Equation 1)}$$

where A and B represent multi-bit operands, N represents bit position, "·" represents a two bit logical AND function, and "+" represents a two bit logical OR function. According to equation 1, for each particular PGK stage 207, a CI is "killed" (i.e., $CO_N=0$, regardless of the value of $CI_N$) if the operands $A_N$ and $B_N$ are both "0", a CO is "generated" (i.e., $CO_N=1$, regardless of the value of $CI_N$) if the operands $A_N$ and $B_N$ are both "1", and a CI is propagated (i.e., $CO_N=CI_N$) if the operands $A_N \neq B_N$. Table 1 below summarizes equation 1.

TABLE 1

| $A_N$ | $B_N$ | $CI_N$ | $CO_N$ |
|---|---|---|---|
| 0 | 0 | ? | "0" (kill) |
| 1 | 1 | ? | "1" (generate) |
| 0 | 1 | $CI_N$ | $CI_N$ (propagate) |
| 1 | 0 | $CI_N$ | $CI_N$ (propagate) |

Sum cells 210 at each bit position N are coupled to receive the $CI_N$ of that particular bit position and sum the $CI_N$ with the corresponding bit positions of the operands $A_N$ and $B_N$. Accordingly, sum cell$_0$ 210 is coupled to receive $CI_0$ and sum cell$_{15}$ 210 is coupled to receive $CI_{15}$. In one embodiment, sum cells 210 logically XOR $CI_N$ with a logical XOR of $A_N$ and $B_N$ received from sum logic 212. Accordingly, each sum cell 210 generates one bit of the multi-bit resultant (i.e., sum$_N$) according to equation equation 2

$$SUM_N = A_N \oplus B_N \oplus CI_N \quad \text{(Equation 2)}$$

wherein $\oplus$ represents a logical XOR function. However, sum cells 210 cannot sum a particular bit position until the CI of that bit position is resolved. $CI_N$ is not resolved until the CO of the previous PGK stage 207 (i.e., $CO_{N-1}$) is resolved. Therefore, waiting for the carry bits to resolve along carry chain 205 would be a speed critical limiting factor for operation of adder 200.

Consequently, carry-skip network 215 takes advantage of the scenario where $CO_N=CI_N$ to skip the CO of one PGK stage 207 over multiple PGK stages 207 to be provided as the CI of a downstream PGK stage 207. The carry-skip ("CS") cells cluster PGK stages 207 into "groups". For example, CS cell$_0$ 217 clusters PGK cells$_{0,1,2}$ 207 into a group-1, CS cell$_1$ 217 clusters PGK stages$_{1,2}$ 207 into a group-2, CS cell$_9$ 217 clusters PGK stages$_{11-15}$ 207 into a group-9, and so on. As such, each CS cell 217 is coupled to group propagate ("GP") logic 240 to determine when a CI into a particular group will propagate through the entire group (only a portion of GP logic 240 is illustrated so as not to crowd FIG. 2). In a scenario where a CI will propagate across an entire group, the corresponding CS cell 217 will forward the CI of that group to the next group by skipping the group without waiting for the CI to propagate along carry chain 205 through the group. For example, GP logic$_0$ 240 may determine that $CI_0$ will propagate through group 1 (i.e., PGK stages$_{0,1,2}$ 207). In this example, PG logic$_0$ 240 instructs CS cell$_0$ 217 to skip $CI_0$ to bit position 3 to be provided as $CI_3$ to PGK stage$_3$ 207.

In one embodiment, each CS cell 217 of carry-skip network 215 is a negative-type field effect transistor ("NFET"). In one embodiment, the source and drain terminals of the NFETs are coupled to shunt the groups of PGK stages 207 while the gate terminals are coupled to the corresponding GP logic 240. In these NFET embodiments, CS cells 217 function as shunt switches selectively opened and closed under the control of GP logic 240 to skip the carry bits over various groups of PGK stages 207. It should be appreciated that more or less CS cells 217 may shunt various other group configurations of PGK cells 207, than is illustrated in FIG. 2.

In one embodiment, GP logic 240 generates GP signals to control the CS cells 217. The GP signals are generated by logically ANDing propagate variables $P_N$ corresponding to each bit position N. $P_N$ is given by equation 3, $$P_N = A_N \oplus B_N \quad \text{(Equation 3)}$$

where $\oplus$ represents a two bit logical XOR function. The GP signal controlling a particular CS cell 217 is generated by logically ANDing the $P_N$ of each bit location shunted by the particular CS cell 217. For example, CS cell$_0$ 217 is controlled by a GP$_0$ signal, which is given by equation 4.

$$GP_0 = P_0 \cdot P_1 \cdot P_2 \quad \text{(Equation 4)}$$

Similarly, CS cell$_9$ 217 is controlled by GP$_9$ signal, which is given by equation 5.

$$GP_9 = P_{11} \cdot P_{12} \cdot P_{13} \cdot P_{14} \cdot P_{15} \quad \text{(Equation 5)}$$

As illustrated in FIG. 2, adder 200 is divided into less significant bit ("LSB") positions, more significant bit ("MSB") positions, and an intermediate bit position. The LSB positions are those bit positions being less significant than the intermediate bit position, while the MSB positions are those bit positions being more significant than the intermediate bit position. Although FIG. 2 allocates the LSB positions as bits 0-10, the intermediate bit position as bit 11, and the MSB positions as bits 11-15, other embodiments may inclued other allocations.

Referring to FIG. 1, one possible worst case operation time for carry-skip adder 100 takes place when the summed operands are such that carry-out 120 is generated by PGK stage$_0$ 105, carry-out 120 carry skips the intermediate PGK stages$_{1-14}$ 105 via CS cells$_{1,2,5,9}$ 110, and is finally summed with operand bits $A_{15}$ and $B_{15}$ at sum cell$_{15}$ 115. Accordingly, the longest delay path (and therefore the critical path) of carry-skip adder 100 is six blocks long.

Returning to FIG. 2, carry-sum cells 220 are all coupled to receive $CI_{11}$ from the intermediate bit position on carry chain 205. Carry-sum cells 220 each merge the functionality of a carry-skip cell with a sum cell to speed up the operation of adder 200, as compared to carry-skip adder 100. For example, during the worst case operation of adder 200 mentioned above, $CO_0$ is generated by PGK stage$_0$ 207 and carry skipped to intermediate node 245 via carry-skip cells CS cells$_{1,2,5}$ 217. $CO_0$ is then input into carry-sum cells 220 as $CI_1$ to compute one or more resultant bits 12-15. Accordingly, the longest delay path (and therefore the critical path) of adder 200 is only five blocks long. Thus, adder 200 effectively reduces the number of delays to process a worst-case carry-skip to the MSB positions. One less block to traverse from the least significant bit position to the summation output of the most significant bit sum cell$_{15}$ 210 (or carry-sum cell$_{15}$ 220) results in less resistance and capacitance experienced by a carry bit traversing carry-skip network 215. This reduction in the propagation delay of the longest (and slowest) carry-skip propagation paths results in an overall speedup of adder 200.

In one embodiment, carry-sum cells 220 perform a global path carry-sum function while sum cells$_{12-15}$ 210 perform a local path summation function. If a CI is generated within one of the MSB positions (e.g., $CI_{12-15}$) then, the global path carry-sum cells 220 are disabled, and the local path CI will be propagated, generated, or killed by PGK stages$_{12-15}$ 207 and sum cells$_{12-15}$ will compute one or more of the resultant bits 12-15. However, if a CI is not generated within the MSB positions, then $CI_{11}$ may be used directly by each of carry-sum cells 220 to compute each of the resultant bits 12-15 (i.e., bit sums 12-15). Carry-sum cells 12-15 merge carry-skip functionality with summation functionality, thereby eliminating carry-skip cells$_{7,8}$ 110, illustrated in FIG. 1.

In one embodiment, carry-sum cells$_{12-15}$ 220 perform logical XOR functions on $CI_{11}$ and control signals received from corresponding control blocks 250 coupled to each of carry-sum cells 220 (only control blocks$_{12,15}$ 250 have been illustrated so as not to clutter FIG. 2). In one embodiment, each control signal is generated by logically ANDing the propagate variables $P_N$ between and including the intermediate bit position (e.g., bit position 11) to the corresponding bit position of the carry-sum cell 220. Therefore, a control$_N$ signal is given by equation 6.

$$CTRL_N = GP_{11 \to (N-1)} \cdot P_N \quad \text{(Equation 6)}$$

For example, control block$_{12}$ 250 generates a control$_{12}$ signal according to equation 7.

$$CTRL_{12} = (P_{11}) \cdot P_{12} \quad \text{(Equation 7)}$$

Similarly, control block$_{15}$ 250 generates a control$_{15}$ signal according to equation 8.

$$CTRL_{15} = (P_{11} \cdot P_{12} \cdot P_{13} \cdot P_{14}) \cdot P_{15} \quad \text{(Equation 8)}$$

Since the critical path of adder 200 does not traverse through the local path along PGK stages$_{11-15}$ 207 and sum cells$_{12-15}$ 210, the transistors used to form PGK stages$_{11-15}$ 207 and sum cells$_{12-15}$ 210 can be downsized significantly. Downsizing these devices not only conserves valuable real estate on an integrated circuit die, but also reduces capacitive load reflected back onto the global path and carry-skip network 215. Reducing the capacitive load reflected back from the MSB positions allows carry-in bits to traverse adder 200 with less time. As mentioned above, the resistance of carry-skip network 215 is also reduced due to the techniques described herein. Therefore, the reduced resistance-capacitance factor (RC delay) along all critical carry-skip propagation paths results in a faster summation computation by adder 200.

Sense amplifiers 225 are coupled to the outputs of sum cells 210 and carry-sum cells 220. In one embodiment, sense amplifiers 225 sense the voltage output by each of sum cells 210 and carry-sum cells 220 and register either a logic "1" or a logic "0". In one embodiment, adder 200 is a low voltage swing ("LVS") adder. In this LVS adder embodiment, each of PGK stages 207, sum cells 210, and carry-sum cells 220 output differential complement signals. Sense amplifiers 225 sense a polarity of a differential voltage between the complementary signals to determine whether a logic "1" or a logic "0" has been computed at each resultant bit position.

LVS adders are susceptible to differential noise created by various coupling and device leakage events along the carry chain (e.g., carry chain 205) and the carry-skip network (e.g., carry-skip network 215). These differential noise sources act to reduce the differential magnitude of the carry signal being propagated. In a worst-case outcome, the differential noise overwhelms the differential carry signal causing a differential reversal and failure of the LVS adder. More typically, the reduced differential magnitude of the carry signal simply results in a slowdown of the LVS adder. One reason why LVS adders are susceptible to differential noise is that a noise rejection path (pathway to sink the noise charge that entered the carry chain) is very resistive (e.g., up to 6 delay blocks worth of resistance prior to the sink/source node) and and therefore difficult to sink noise charge through the carry-skip network.

The incorporation of carry-sum cells 220 allows a single delay block reduction in the critical path over carry-skip adder 100 and this results in a resistance reduction of carry-skip network 215. In the LVS adder embodiment of adder 200, reduced resistance of carry-skip network 215 provides increased differential noise rejection along carry-skip network 215. The reduction of this resistance results in a faster and more robust LVS adder.

The processes explained below are described in terms of computer software and hardware. The processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

Figure 3:
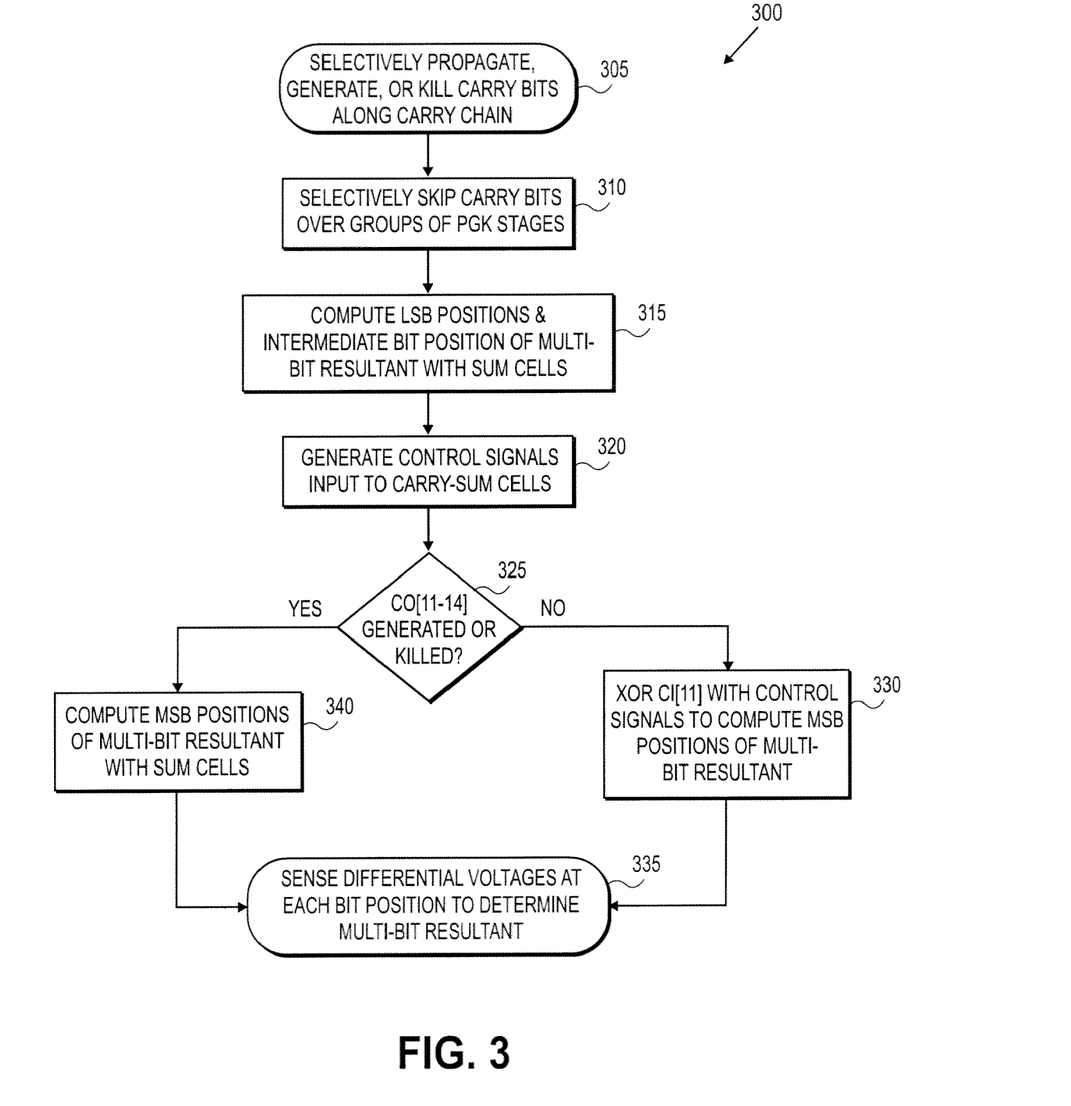
FIG. 3 is a flow chart illustrating a process for operation of an adder, in accordance with an embodiment of the present invention.

FIG. 3 is a flow chart illustrating a process 300 for operating adder 200, in accordance with an embodiment of the present invention. In a process block 305, the carry bits (e.g., $CI_{0-15}$) are selectively propagated, generated, or killed at each PGK stage 207 along carry chain 205.

In a process block 310, some of the carry bits are selectively skipped over groups of PGK stages 207. For example, if GP logic$_2$ 240 determines that $CI_3$ carried into PGK stage$_3$ 207 will propagate through all of group-2 (i.e., PGK stages$_{3,4,5,6}$ 207), then CS cell$_2$ 217 will skip $CI_3$ over group-2 to be provided as $CI_7$ to PGK stage$_7$ 207. In one embodiment, CS cells 217 skip carry bit over groups of PGK stages 207 by providing a conducting path for carry bits to propagate through.

In a process block 315, sum cells$_{0-11}$ 210 compute the LSB positions and the intermediate bit position of the multi-bit resultant. In one embodiment, sum cells 210 each compute one bit of the multi-bit resultant by logically XORing the $CI_N$ bit with the sum signal computed by each corresponding sum logic$_N$ 212. Each sum logic$_N$ 212 generates a sum of operands $A_N$ and $B_N$, which is summed with $CI_N$ by sum cell$_N$ 210.

In a process block 320, control logic$_N$ 250 generates the control signals to be provided to corresponding ones of carry-sum cells$_N$ 220. The control signals are generated based on the operands A and B, as described above.

In a decision block 325, if a local carry-out (i.e., $CO_{11-15}$) is not generated or killed by one of PGK stages$_{11-14}$ 207, then process 300 continues to a process block 330. In process block 330, each carry-sum cell 220 logically XORs its corresponding control signal with $CI_{11}$ to compute each MSB position of the multi-bit resultant. In a process block 335, the voltages output by sum cells$_{0-11}$ 210 and carry-sum cells 220 are sensed by sense amplifiers 225 to determine/register the multi-bit resultant.

Returning to decision block 325, if a local carry-out (i.e., $CO_{11-14}$) is generated or killed (i.e., if one of PGK stages$_{11-15}$ generates or kills a carry-out), then all CI's from that point onwards are determined along the local path of carry chain 205. It should be appreciated that if PGK stage$_{14}$ 207 generates a carry-out while PGK stages$_{12,13}$ 207 propagate $CI_{11}$, then carry-sum cells$_{12,13}$ 220 will compute sum$_{12}$ and sum$_{13}$ while sum cells$_{14,15}$ 210 will compute sum$_{14}$ and sum$_{15}$. In process block 340, sum cells$_{12-15}$ 210 compute the MSB positions of the multi-bit resultant. In process block 335, sense amplifiers 225 sense the voltages output by sum cells$_{0-11}$ 210 and carry-sum cells$_{12-15}$ 220.

Figure 4:
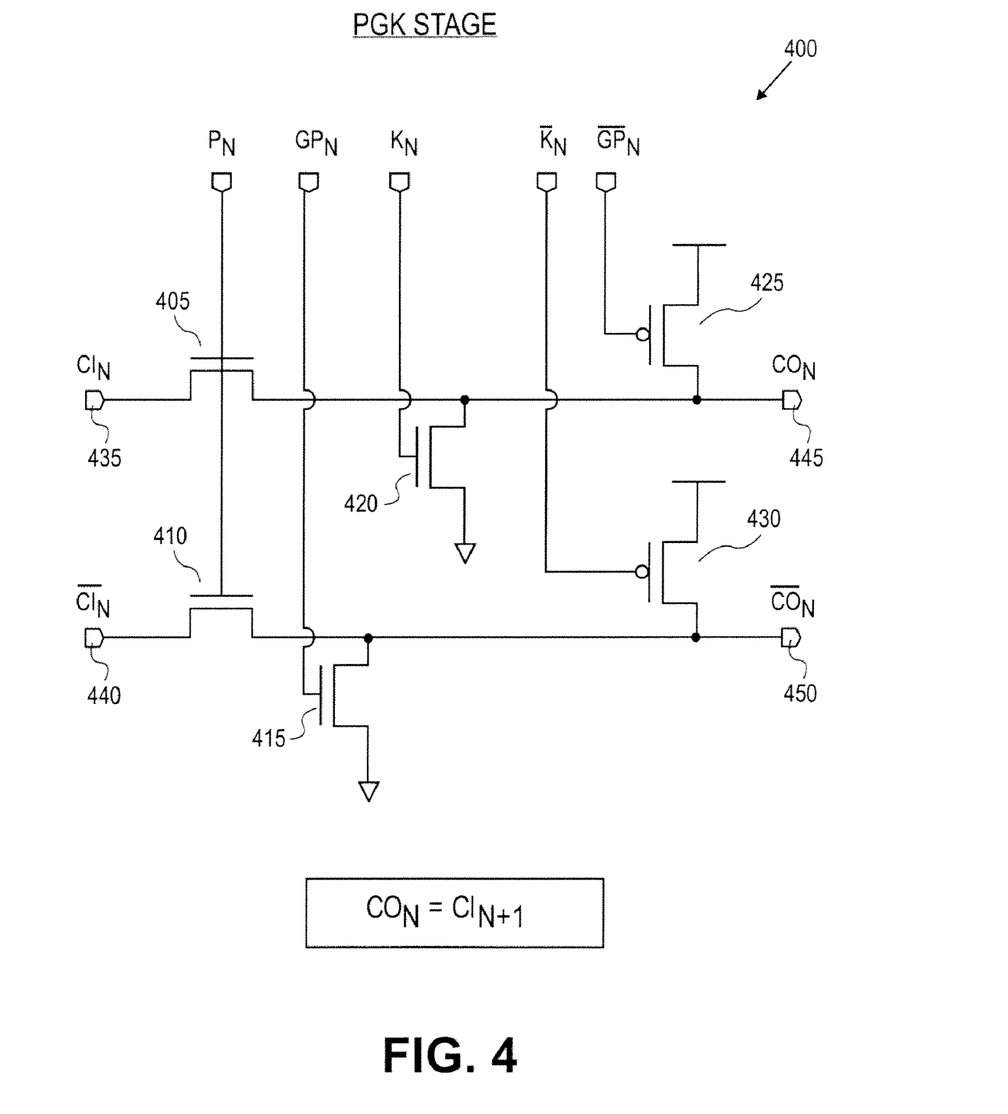
FIG. 4 is a circuit diagram illustrating a propagate, generate, kill ("PGK") stage, in accordance with an embodiment of the present invention.

FIG. 4 is a circuit diagram illustrating a PGK stage 400, in accordance with an embodiment of the present invention. PGK stage 400 is one possible embodiment of PGK cells 207. The illustrated embodiment of PGK stage 400 includes four NFET transistors 405, 410, 415, and 420, and two positive-type field effect transistors ("PFETs") 425 and 430. PGK stage 400 receives complementary inputs $CI_N$ and computes complementary outputs $CO_N$. PGK stages 400 may be used in connection with LVS adder embodiments of adder 200.

In one embodiment, the gates of the NFETs and the PFETs are coupled to PGK logic 209, illustrated in FIG. 2 (only one PGK logic unit is illustrated so as not to clutter FIG. 2). PGK logic 209 generates the control variables $P_N$, $GP_N$, $K_N$, $K_N\_bar$, and $GP_N\_bar$. The control variables $P_N$ and $GP_N$ are similar as described above in connection with equations 3, 4, and 5. The control variable $K_N$ is asserted high if PGK logic 209 determines, based on operands $A_N$ and $B_N$, that the particular PGK stage$_N$ 207 should "kill" the $CI_N$.

$CI_N$ and its complement $CI_N\_bar$ are received at inputs 435 and 440 and $CO_N$ and $CO_N\_bar$ are output at outputs 445 and 450, respectively. Transistors 405 and 410 propagate $CI_N$ and $CI_N\_bar$ if $P_N$ is asserted high by PGK logic 209. Transistor 425 generates $CO_N$ if $GP_N\_bar$ is asserted low. Similarly, transistor 420 kills $CI_N$ if $K_N$ is assert high.

Figure 5:
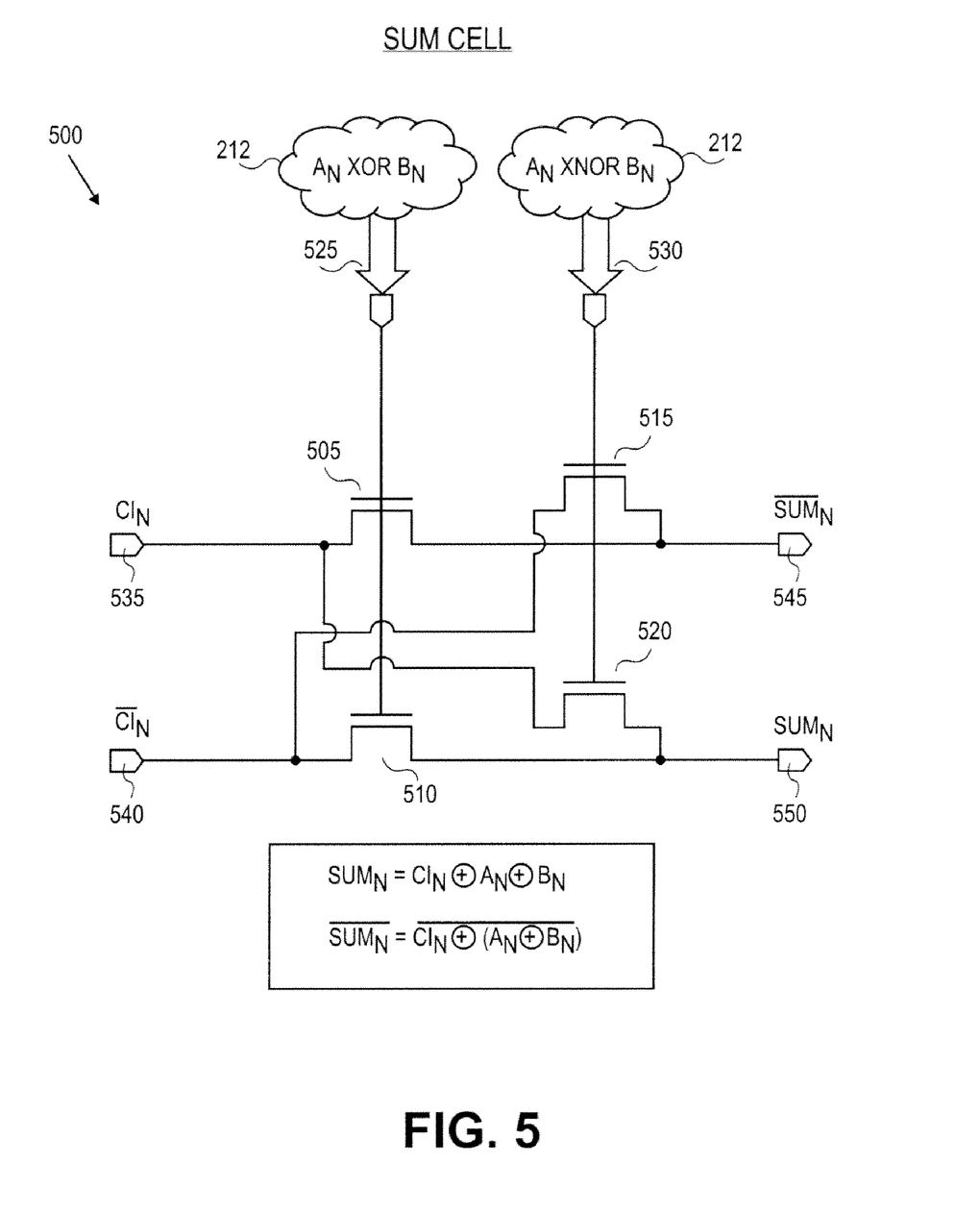
FIG. 5 is a circuit diagram illustrating a sum cell, in accordance with an embodiment of the present invention.

FIG. 5 is a circuit diagram illustrating a sum cell 500, in accordance with an embodiment of the present invention. Sum cell 500 is one possible embodiment of sum cells 210. The illustrated embodiment of sum cell 500 includes NFETs 505, 510, 515, and 520. Sum cell 500 receives an XOR input 525 to control the gates of NFETs 505 and 510 and receives an XNOR input 530 to control the gates of NFETs 515 and 520. Sum cell 500 receives $CI_N$ and its complement $CI_N\_bar$ on inputs 535 and 540, respectively, and computes $SUM_N\_bar$ and $SUM_N$ (see equation 2) on its outputs 545 and 550, respectively.

XOR inputs 525 and XNOR input 530 are generated by sum logic 212, based on operand bits $A_N$ and $B_N$. Sum cell 500 computes a logical XOR of XOR input 525 and $CI_N$ received on input 535 to generate $sum_N$ on output 550. Similarly, sum cell 500 computes a logical XNOR of XNOR input 530 and $CI_N\_bar$ received on input 540 to generate $sum_N\_bar$ on output 545.

Figure 6:
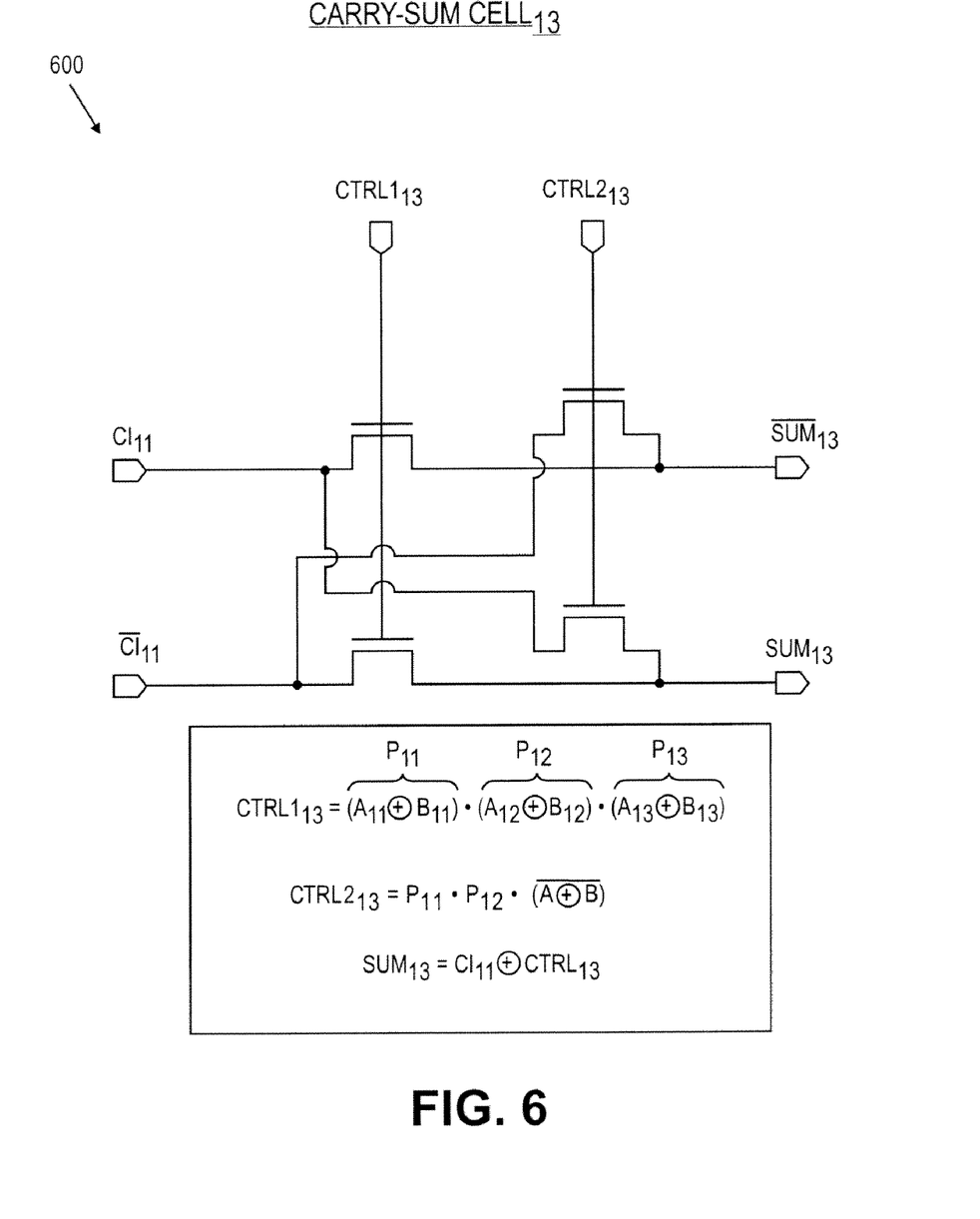
FIG. 6 is a circuit diagram illustrating a carry-sum cell, in accordance with an embodiment of the present invention.

FIG. 6 is a circuit diagram illustrating a carry-sum cell 600, in accordance with an embodiment of the present invention. Carry-sum cell 600 is one possible embodiment of carry-sum cell$_{13}$ 220. The illustrated embodiment of carry-sum cell 600 is similar to sum cell 500, except the inputs are coupled to receive different variables. Although carry-sum cell 500 is illustrated for use with bit position 13 of adder 200, carry-sum cell 500 is equally applicable to each of the MSB positions. Depending upon the particular MSB position, the particular propagate variables $P_N$ logically ANDed together varies, as described above in connection with equations 6, 7 and 8.

Carry-sum cell 600 is one embodiment of a carry-sum cell 220 for use with an LVS adder. Accordingly, carry-sum cell 600 receives and generates differential signals. Similarly, in this embodiment, control blocks 250 provide carry-sum cells 600 with a pair of control signals $CTRL1_N$ and $CTRL2_N$, given by equations 9 and 10, and 11.

$$CTRL1_N = GP_{11 \to (N-1)} \cdot P_N, \quad \text{(Equation 9)}$$

$$CTRL2_N = GP_{11 \to (N-1)} \cdot \overline{P_N}, \quad \text{(Equation 10)}$$

$$\text{where } \overline{P_N} = \overline{(A_N \oplus B_N)} \quad \text{(Equation 11)}$$

Figure 7:
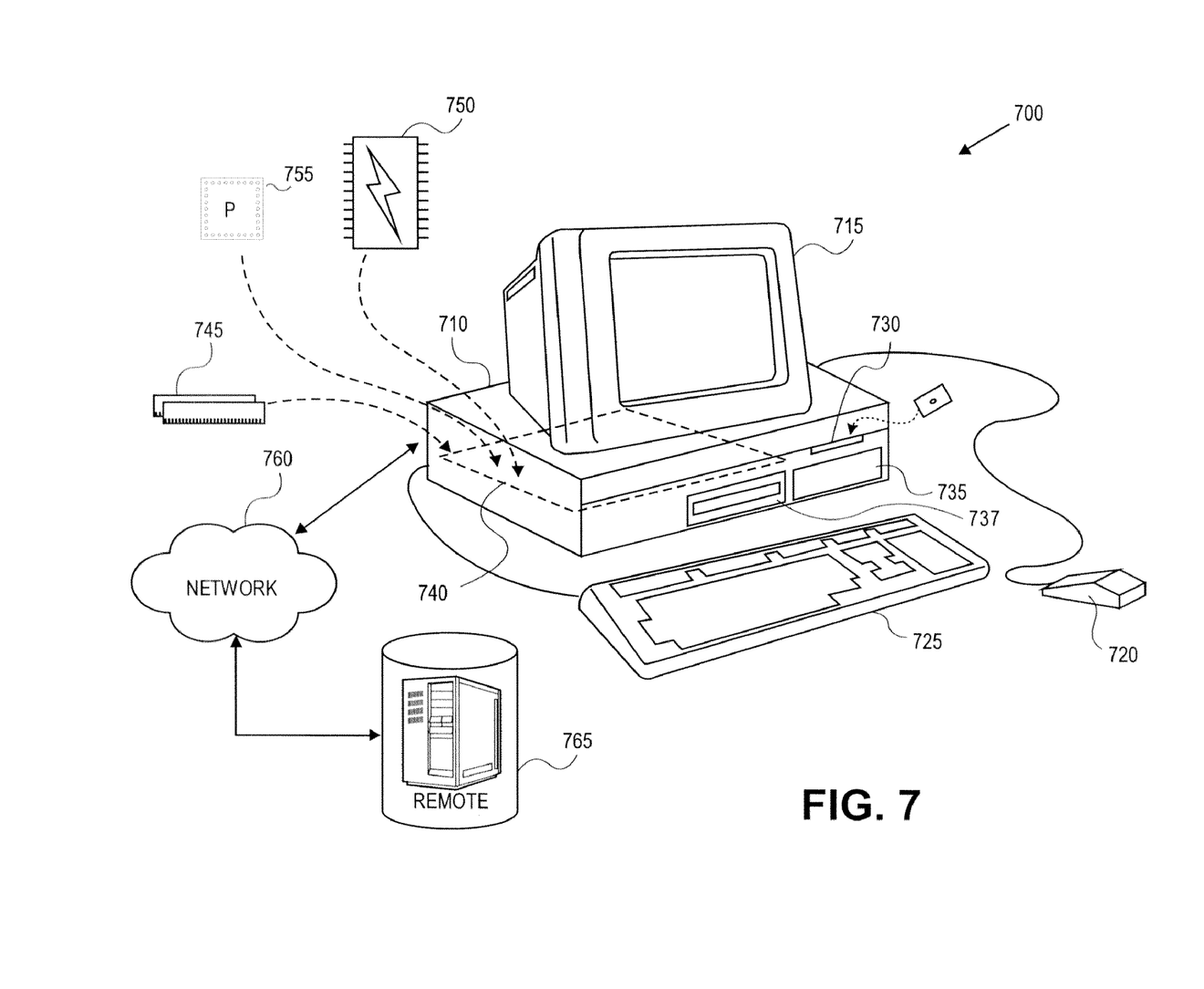
FIG. 7 is a diagram illustrating a demonstrative system implementing embodiments of the present invention.

FIG. 7 is a diagram of a system 700 that may incorporate one or more adders 200, in accordance with embodiments of the present invention. The illustrated embodiment of system 700 includes a chassis 710, a monitor 715, a mouse 720 (or other pointing device), and a keyboard 725. The illustrated embodiment of chassis 710 further includes a floppy disk drive 730, a hard disk 735, a compact disc ("CD") and/or digital video disc ("DVD") drive 737, a power supply (not shown), and a motherboard 740 populated with appropriate integrated circuits including system memory 745, nonvolatile ("NV") memory 750, and one or more processor(s) 755.

Processor(s) 755 is communicatively coupled to system memory 745, NV memory 750, hard disk 735, floppy disk drive 730, and CD/DVD drive 737 via a chipset on motherboard 740 to send and to receive instructions or data thereto/therefrom. In one embodiment, NV memory 750 is a flash memory device. In other embodiments, NV memory 750 includes any one of read only memory ("ROM"), programmable ROM, erasable programmable ROM, electrically erasable programmable ROM, or the like. In one embodiment, system memory 745 includes random access memory ("RAM"), such as dynamic RAM ("DRAM"), synchronous DRAM, ("SDRAM"), double data rate SDRAM ("DDR SDRAM") static RAM ("SRAM"), and the like. Hard disk 735 represents any storage device for software data, applications, and/or operating systems, but will most typically be a nonvolatile storage device. Hard disk 735 may optionally inclued one or more of an integrated drive electronic ("IDE") hard disk, an enhanced IDE ("EIDE") hard disk, a redundant array of independent disks ("RAID"), a small computer system interface ("SCSI") hard disk, and the like.

In one embodiment, a network interface card ("NIC") (not shown) is coupled to an expansion slot (not shown) of motherboard 740. The NIC is for connecting system 700 to a network 760, such as a local area network, wide area network, or the Internet. In one embodiment network 760 is further coupled to a remote computer 765, such that system 700 and remote computer 765 can communicate.

In one embodiment, processor 755 may inclued one or more adders 200 to provide full adder functionality. For example, processor 755 may inclued an arithmetic logic unit ("ALU") to perform mathematical functions having one or more adders 200 cascaded to provide higher order summation functionality. Embodiments of adder 200 may be incorporated into the ALU to implement high-speed ALU subcomponents.

As described above, adder 200 may be incorporated into processor 755, as well as, various other integrated circuits. Descriptions of adder 200 may be generated and compiled for incorporation into processor 755 or other various application specific integrated circuits ("ASICs"). For example, behavioral level code describing adder 200, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe embodiments of adder 200.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims, Rather, the scope of the invention is to be determined entirely by the following claims, which are to be construed in accordance with established doctrines of claim interpretation.

What is claimed is:

1. A method of operation of a multi-bit adder, comprising:
selectively propagating, generating, or killing carry-in bits along a carry chain;
summing equivalent bit positions of a first operand, a second operand, and the carry-in bits to obtain a first portion of a multi-bit resultant, the first portion including an intermediate bit position and less significant bit positions than the intermediate bit position;
generating control signals based on the first and second operands;
logically XORing the intermediate bit position of the carry-in bits with the control signals to determine a second portion of the multi-bit resultant if the intermediate bit position does not generate a carry-out, the second portion including more significant bit positions than the intermediate bit position; and
summing equivalent bit positions of the first operand, the second operand, and the carry-in bits to obtain the second portion of the multi-bit resultant, if the intermediate bit position does generate the carry-out.

2. The method of claim 1, further comprising:
selectively skipping at least some of the carry-in bits over portions of the carry chain, if the portions are determined to propagate the at least some of the carry-in bits.

3. The method of claim 2, wherein generating the control signals comprises:
generating a propagate value for each of the more significant bit positions and the intermediate bit position by logically XORing the intermediate bit position and the more significant bit positions of the first and second operands; and
logically ANDing the propagate values between and including the intermediate bit position and each one of the more significant bit positions.

4. The method of claim 1, further comprising:
sensing differential voltages for each bit position of the multi-bit resultant to determine digital values of the multi-bit resultant.

5. A multi-bit adder apparatus, comprising:
a carry chain to selectively propagate, generate, and kill carry-in bits;
a carry-skip network coupled to the carry chain to selectively skip the carry-in bits over portions of the carry chain;
first sum cells coupled along the carry chain to sum equivalent bit positions of first and second operands and the carry bits to generate a first portion of a multi-bit resultant, the first portion including an intermediate bit position and less significant bit positions than the intermediate bit position; and
multiple carry-sum cells each coupled to the intermediate bit position of the carry chain to logically XOR the intermediate bit position of the carry-in bits with control signals to generate a second portion of the multi-bit resultant, the second portion including more significant bit positions than the intermediate bit position.

6. The multi-bit adder apparatus of claim 5, wherein the integrated circuit further comprises control blocks each coupled to one of the carry-sum cells to generate the control signals, the control blocks each including:
XOR logic coupled to logically XOR the intermediate bit position and at least some of the more significant bit positions of the first and second operands to generate propagate values; and
AND logic coupled to logically AND the propagate values between and including the intermediate bit position and a bit position of the control block.

7. The multi-bit adder apparatus of claim 6, further comprising:
second sum cells coupled along the carry chain to sum equivalent bit positions of the first and second operands and the carry bits to generate the second portion of a multi-bit resultant, if the intermediate bit position generates a carry-out.

8. The multi-bit adder apparatus of claim 5, wherein the first and second sum cells are coupled to generate the multi-bit resultant as voltage differentials, and further comprising:
sense amplifiers coupled to sense the voltage differentials output from each of the first and second sum cells.

9. The multi-bit adder apparatus of claim 5, wherein:
the carry chain comprises cascaded propagate-generate-kill ("PGK") stages to selectively propagate, generate, and kill the carry-in bits; and
the carry-skip network comprises carry-skip cells coupled to the carry chain to selectively skip the carry-in bits over groups of the PGK stages.

10. The multi-bit adder apparatus of claim 9, wherein each carry-skip cell comprises:
a transistor having a source terminal, a drain terminal, and a gate terminal, the source and drain terminals coupled to shunt one of the groups of PGK stages; and
group propagate ("GP") logic coupled to the gate terminal, the GP logic to determine when a carry-in bit to the shunted one of the groups of PGK stages can skip over the shunted one of the groups of PGK stages to be a next carry-in bit to a next group of the PGK stages.

11. The multi-bit adder apparatus of claim 9, comprising 16 PGK stages, 16 sum cells, and 4 carry-sum cells, and wherein the multi-bit adder comprises a 16-bit full adder.

12. The multi-bit adder apparatus of claim 5, wherein the multi-bit adder comprises a low voltage swing adder and the sum cells are coupled to generate the multi-bit resultant as voltage differentials, and further comprising:
sense amplifiers coupled to sense the voltage differentials output from the sum cells.

13. A system, comprising:
synchronous dynamic random access memory ("SDRAM"); and
a processor coupled to access the SDRAM, the processor including a multi-bit adder, the multi-bit adder including:
a carry chain to at least one of propagate, generate, or kill carry-in bits;
a carry-skip network coupled to the carry chain to selectively skip the carry-in bits over at least one portion of the carry chain;
sum cells coupled along the carry chain to sum the carry-in bits with corresponding bits of two operands, each of the sum cells to generate one bit of a multi-bit resultant; and
multiple carry-sum cells coupled to receive one of the carry-in bits to a single intermediate bit position on the carry chain and to contingently generate a more significant bit portion of the multi-bit resultant having bit positions between the intermediate bit position and a most significant bit ("MSB") position including the MSB position.

14. The system of claim 13, wherein the carry-sum cells are coupled to logically XOR the one of the carry-in bits to the single intermediate bit position with control signals to generate the portion of the multi-bit resultant.

15. The system of claim 14, wherein the multi-bit adder further comprises control blocks coupled to the carry-sum cells to generate the control signals, each of the control blocks coupled to determine propagate values corresponding to each bit position of the multi-bit resultant between and including the intermediate bit position and a bit position of a corresponding carry-sum cells, each of the control blocks to logically AND the propagate values to generate a corresponding control signal.

16. The system of claim 13, wherein a portion of the sum cells are each coupled to one of the multiple carry-sum cells having corresponding bit positions to generate some of the portion of the multi-bit resultant having bit positions between the intermediate bit position and the MSD position if one of the carry-in bits is generated between the intermediate bit position and the MSB position.

17. The system of claim 16, wherein the multi-bit adder comprises a 16-bit low voltage swing ("LVS") adder having a MSB carry-out and a least significant bit ("LSB") carry-in.

18. The system of claim 17, further comprising at least two 16-bit LVS adders coupled in series, wherein the MSB carry-out of a first one of the 16-bit LVS adders is coupled to the LSB carry-in of a second one of the 16-bit LVS adders.

* * * * *

UNITED STATES PATENT AND TRADEMARK OFFICE
CERTIFICATE OF CORRECTION

PATENT NO. : 7,516,173 B2  Page 1 of 1
APPLICATION NO. : 10/911824
DATED : April 7, 2009
INVENTOR(S) : Wijeratne et al.

It is certified that error appears in the above-identified patent and that said Letters Patent is hereby corrected as shown below:

In column 12, at line 2 delete, "MSD" and insert -- MSB --.

Signed and Sealed this

Second Day of November, 2010

David J. Kappos
*Director of the United States Patent and Trademark Office*